United States Patent
Tashiro (10) Patent No.: US 10,953,753 B2
(45) Date of Patent: Mar. 23, 2021

(54) ELECTRIFIED VEHICLE AND CONTROL METHOD FOR ELECTRIFIED VEHICLE

(71) Applicant: TOYOTA JIDOSHA KABUSHIKI KAISHA, Toyota (JP)

(72) Inventor: Hiroki Tashiro, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 16/288,214

(22) Filed: Feb. 28, 2019

(65) Prior Publication Data
US 2019/0275889 A1 Sep. 12, 2019

(30) Foreign Application Priority Data

Mar. 8, 2018 (JP) .............................. JP2018-041886

(51) Int. Cl.
| | |
|---|---|
| *B60L 3/00* | (2019.01) |
| *G07C 5/08* | (2006.01) |
| *B60R 16/023* | (2006.01) |
| *B60L 50/60* | (2019.01) |
| *B60L 58/12* | (2019.01) |
| *B60R 16/033* | (2006.01) |

(52) U.S. Cl.
CPC ............. *B60L 3/0038* (2013.01); *B60L 50/60* (2019.02); *B60L 58/12* (2019.02); *B60R 16/0232* (2013.01); *B60R 16/033* (2013.01); *G07C 5/0808* (2013.01); *B60Y 2200/91* (2013.01)

(58) Field of Classification Search
CPC .... B60L 3/0023; B60L 3/0038; B60L 3/0046; B60R 16/0232; B60R 16/033; G07C 5/0808

USPC .............. 701/22, 107, 29.1, 29.2, 31.8, 31.9
See application file for complete search history.

(56) References Cited

U.S. PATENT DOCUMENTS

| | | | | |
|---|---|---|---|---|
| 6,131,057 A | * | 10/2000 | Tamaki | ................. B60L 3/0061 701/22 |
| 2011/0264323 A1 | * | 10/2011 | Sakakibara | ........ G05B 23/0262 701/31.4 |
| 2019/0047560 A1 | * | 2/2019 | Kinoshita | ............. B60W 30/10 |

FOREIGN PATENT DOCUMENTS

| | | | |
|---|---|---|---|
| JP | 2009-018694 A | 1/2009 | |
| JP | 2009-145065 A | 7/2009 | |
| JP | 2013-169917 A | 9/2013 | |
| JP | 2015-074322 A | 4/2015 | |

* cited by examiner

*Primary Examiner* — Isaac G Smith
(74) *Attorney, Agent, or Firm* — Sughrue Mion, PLLC (57) ABSTRACT

An electrified vehicle includes an electric power storage device, a drive device, a sensor, and an electronic control unit. The electronic control unit causes transition of a traveling mode to an FS mode when a FS traveling condition is established. The electronic control unit detects a sign of an abnormality of an assembled battery using a detection value of a sensor when a sensor unit is normal. When the FS traveling condition is established and the sign of the abnormality of the assembled battery is not detected, the electronic control unit sets the FS mode to a predetermined first FS mode. When the FS traveling condition is established and the sign of the abnormality of the assembled battery is detected, the electronic control unit sets the FS mode to a second FS mode different from the predetermined first FS mode.

6 Claims, 6 Drawing Sheets

ELECTRIFIED VEHICLE AND CONTROL METHOD FOR ELECTRIFIED VEHICLE

CROSS-REFERENCE TO RELATED APPLICATIONS

This application claims priority to Japanese Patent Application No. 2018-041886 filed on Mar. 8, 2018, which is incorporated herein by reference in its entirety.

BACKGROUND

1. Technical Field

The present disclosure relates to an electrified vehicle and a control method for an electrified vehicle, and in particular, to an electrified vehicle and a control method for an electrified vehicle that cause transition of a traveling mode to a fail-safe mode when a predetermined fail-safe traveling condition is established.

2. Description of Related Art

Japanese Unexamined Patent Application Publication No. 2015-74322 (JP 2015-74322 A) discloses an electrified vehicle that causes transition to a fail-safe (hereinafter, referred to as "FS") mode when an abnormality of a sensor value is detected. In the vehicle, when the abnormality of the sensor value is continued for a predetermined time, FS traveling (limp home) is performed. Then, when FS traveling is performed in a previous trip, and when the abnormality of the sensor value is detected in a present vehicle start, FS traveling is performed even though the abnormality of the sensor value is not continued for the predetermined time. With this, it is possible to perform FS traveling instantly without needing to stand by for a predetermined time after the vehicle starts (see JP 2015-74322 A).

SUMMARY

In an electrified vehicle that travels using electric power stored in an electric power storage device, such as a secondary battery, when a sensor (voltage sensor, current sensor, or the like) that detects a state of the electric power storage device fails, the state of the electric power storage device cannot be detected. For this reason, when the sensor fails in FS traveling, an abnormality of the electric power storage device is likely to progress while the state of the electric power storage device cannot be detected.

The present disclosure provides an electrified vehicle that travels using electric power stored in an electric power storage device, having an advantage of appropriately protecting the electric power storage device during a fail-safe mode (hereinafter, referred to as an "FS mode").

A first aspect of the present disclosure relates to an electrified vehicle. The electrified vehicle includes an electric power storage device, a drive device, a sensor, and an electronic control unit. The drive device is configured to generate vehicle drive power using electric power stored in the electric power storage device. The sensor is configured to detect a state of the electric power storage device. The electronic control unit is configured to cause transition of a traveling mode to an FS mode when a predetermined FS traveling condition including failure of the sensor is established. The electronic control unit is configured to (i) detect a sign of an abnormality of the electric power storage device using a detection value of the sensor when the sensor is normal, (ii) set the FS mode to a predetermined first FS mode, when the FS traveling condition is established and the sign of the abnormality of the electric power storage device is not detected, and (iii) set the FS mode to a second FS mode different from the predetermined first FS mode, when the FS traveling condition is established and the sign of the abnormality of the electric power storage device is detected.

A second aspect of the present disclosure relates to a control method for an electrified vehicle. The electrified vehicle includes an electric power storage device, a drive device configured to generate vehicle drive power using electric power stored in the electric power storage device, and a sensor configured to detect a state of the electric power storage device. The control method includes (i) detecting a sign of an abnormality of the electric power storage device using a detection value of the sensor when the sensor is normal, and (ii) when a predetermined FS traveling condition including failure of the sensor is established, causing transition of a traveling mode to an FS mode. When the sign of the abnormality of the electric power storage device is not detected, the FS mode is set to a predetermined first FS mode, and when the sign of the abnormality of the electric power storage device is detected, the FS mode is set to a second FS mode different from the predetermined first FS mode.

In the electrified vehicle and the control method described above, the sign of the abnormality of the electric power storage device is detected when the sensor that detects the state of the electric power storage device is normal. Then, when the sign of the abnormality is detected, the FS mode is set to the second FS mode different from the predetermined first FS mode. With this, the second FS mode is set as the FS mode in which the use of the electric power storage device is restricted more than in the predetermined first FS mode, for example, whereby it is possible to suppress the progress of the abnormality of the electric power storage device during the FS mode while the state of the electric power storage device is not detected due to sensor failure. Therefore, with the electrified vehicle and the control method, it is possible to appropriately protect the electric power storage device during the FS mode.

In the above description, the sequence of an establishment timing of the FS traveling condition and a detection timing of the sign of the abnormality of the electric power storage device does not matter. That is, in the electrified vehicle, when the FS traveling condition is established after the sign of the abnormality of the electric power storage device is detected, the FS mode may be set to the second FS mode. Furthermore, in the electrified vehicle, when the sign of the abnormality of the electric power storage device is detected after the FS traveling condition is established, that is, during the predetermined first FS mode, the FS mode may be switched from the predetermined first FS mode to the second FS mode.

For example, when the sign of the abnormality of the electric power storage device is detected when the sensor is normal, and thereafter, the FS traveling condition is established due to failure of the sensor, the FS mode may be set to the second FS mode. Alternatively, for example, when the FS traveling condition is established due to a resistance abnormality of the electric power storage device to cause transition to the FS mode, and thereafter, a sign of a self-discharge abnormality of the electric power storage device is detected (even after transition is made to the FS mode, the sensor is normal at least at this time), the FS mode may be set to the second FS mode. In both cases, it is possible to suppress the progress of the abnormality of the electric power storage device during the FS mode while the state of the electric power storage device is not detected due to sensor failure (in the latter case, when sensor failure occurs after the sign of the self-discharge abnormality is detected).

In the electrified vehicle, the electronic control unit may be configured to, in the first fail-safe mode, perform fail-safe traveling for traveling with more suppressed input and output of the electric power storage device than in a normal traveling mode (when the FS mode is not set), and in the second FS mode, stop a system of the electrified vehicle.

With this, when the sign of the abnormality of the electric power storage device is not detected, predetermined FS traveling can be performed, and when the sign of the abnormality of the electric power storage device is detected, the system of the vehicle is stopped, thereby reliably protecting the electric power storage device.

In the electrified vehicle, the electronic control unit may be configured to (i) detect the sign of the abnormality of the electric power storage device for every predetermined period and store a previous sign detection result at the time of execution of sign detection, the predetermined period being a period longer than a time from an occurrence of failure until the failure is confirmed when the failure occurs in the sensor, (ii) set the fail-safe mode to the first fail-safe mode, when the fail-safe traveling condition is established and determination is made that the sign of the abnormality of the electric power storage device is not detected based on the previous sign detection result, and (iii) set the fail-safe mode to the second fail-safe mode, when the fail-safe traveling condition is established and determination is made that the sign of the abnormality of the electric power storage device is detected based on the previous sign detection result.

With such a configuration, when failure of the sensor occurs, it is possible to detect the sign of the abnormality of the electric power storage device using the detection value of the sensor when the sensor is normal before the sensor fails, and to switch the FS mode based on the sign detection result.

In the electrified vehicle, the electronic control unit may be configured to (i) determine that the electric power storage device is abnormal, when a value of a predetermined parameter indicating a degree of progress of an abnormality of the electric power storage device reaches a first threshold, and (ii) determine that the sign of the abnormality of the electric power storage device is detected, when the value of the predetermined parameter reaches a second threshold smaller than the first threshold.

With the configuration of the electrified vehicle described above, it is possible to suppress the progress of the abnormality of the electric power storage device to an abnormality determination level during the FS mode.

The predetermined parameter may be one of: variation in a state of charge (hereinafter, also referred to as "SOC") among a plurality of cells included in the electric power storage device; variation in resistance value among the plurality of cells; variation in capacitance value among the plurality of cells; an increase rate of the resistance value from an initial state of the electric power storage device; a decrease rate from full charge capacity of capacity of the electric power storage device; and an increase rate of a self-discharge amount of the electric power storage device.

With the electrified vehicle and the control method for an electrified vehicle in the present disclosure, it is possible to appropriately protect the electric power storage device during the FS mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described in detail referring to the drawings. The same or similar portions in the drawings are represented by the same reference numerals, and description thereof will not be repeated.

Figure 1:
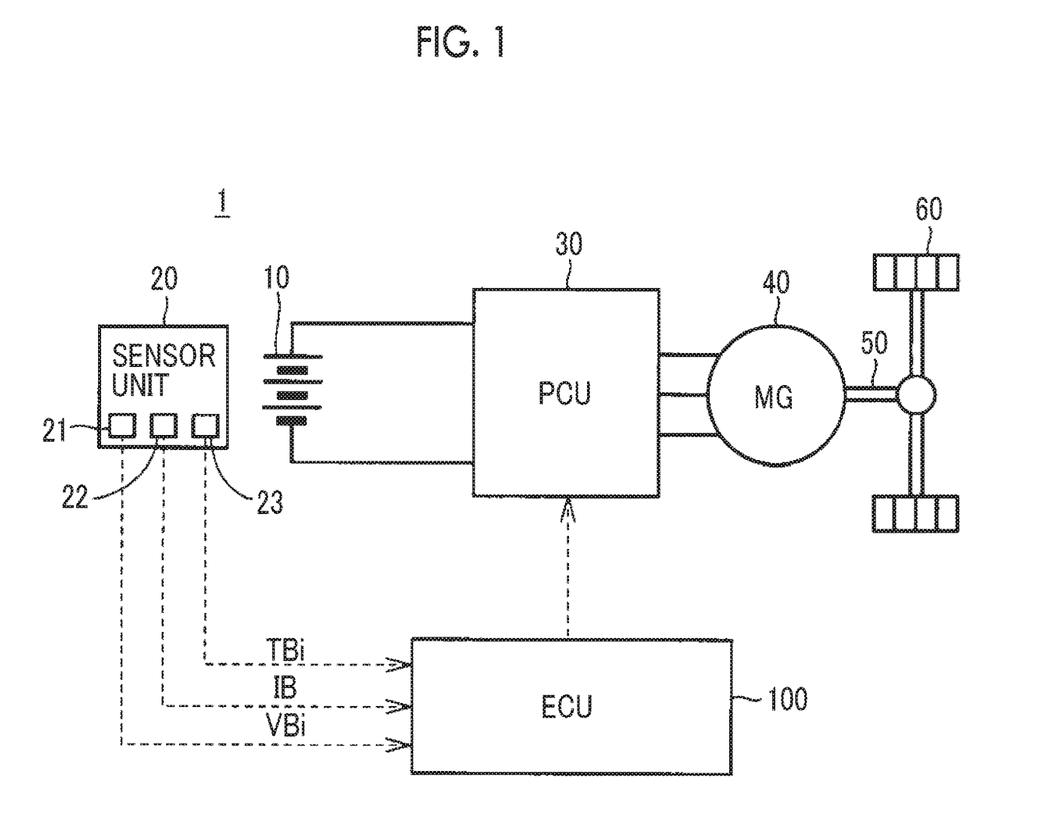
FIG. 1 is a diagram schematically showing the configuration of an electrified vehicle according to an embodiment of the present disclosure.

FIG. 1 is a diagram schematically showing the configuration of an electrified vehicle according to the embodiment of the present disclosure. Hereinafter, although a case where the electrified vehicle is an electric vehicle mounted with no engine will be representatively described, the electrified vehicle according to the embodiment of the present disclosure can be applied to electrified vehicles (capable of including a hybrid vehicle, a fuel cell vehicle, and the like) that travel using electric power stored in an electric power storage device.

Referring to FIG. 1, an electrified vehicle 1 includes an assembled battery 10, a sensor unit 20, a power control unit (hereinafter, referred to as a "PCU") 30, a motor generator (hereinafter, referred to as an "MG") 40, a drive shaft 50, drive wheels 60, and an electronic control unit (hereinafter, referred to as an "ECU") 100.

The assembled battery 10 as an electric power storage device includes a number of secondary batteries (each secondary battery is referred to as a "cell", a "single battery", or the like, and hereinafter, each secondary battery is referred to as a "cell") appropriately connected at least one of in series or in parallel. Each cell is constituted of a lithium-ion secondary battery, a nickel-hydrogen secondary battery, or the like. The lithium-ion secondary battery is a secondary battery in which lithium is used as a charge carrier, and can include a so-called all-solid battery using a solid electrolyte, in addition to a general lithium-ion secondary battery in which an electrolyte is a liquid. In the embodiment, although the electric power storage device is the assembled battery 10, a large capacity capacitor, such as an electric double layer capacitor, may be employed as the electric power storage device.

The assembled battery 10 stores electric power for driving the MG 40, and can supply electric power to the MG 40 through the PCU 30. Furthermore, the assembled battery 10 is charged with generated electric power of the MG 40 received through the PCU 30 at the time of regenerative electric power generation of the MG 40, such as at the time of braking of the vehicle. Though not particularly shown, the assembled battery 10 can be charged from a power supply using a charging device that charges the assembled battery 10 from the power supply outside the vehicle.

The sensor unit 20 includes a voltage sensor 21, a current sensor 22, and a temperature sensor 23. The voltage sensor 21 is configured to be able to detect a voltage VBi of each cell of the assembled battery 10. The current sensor 22 detects a current IB flowing in the assembled battery 10. The temperature sensor 23 detects a temperature TBi of each cell. The temperature sensor 23 may detect a temperature with a plurality (several) of adjacent cells as a monitoring unit. A detection value of each sensor is transmitted to the ECU 100.

The PCU 30 executes bidirectional electric power conversion between the assembled battery 10 and the MG 40 in response to a control signal from the ECU 100. The PCU 30 includes, for example, an inverter that drives the MG 40, and a converter that boosts a direct-current voltage to be supplied to the inverter to be equal to or higher than an output voltage of the assembled battery 10.

The MG 40 is representatively an alternating-current rotating electric machine, and is, for example, a three-phase alternating-current synchronous motor in which a permanent magnet is embedded in a rotor. The MG 40 is driven by the PCU 30 to generate rotational drive power, and drive power generated by the MG 40 is transferred to the drive wheels 60 through the drive shaft 50. At the time of braking of the vehicle or at the time of reduction in acceleration on a downward slope, the MG 40 operates as a power generator and performs regenerative electric power generation. Electric power generated by the MG 40 is supplied to the assembled battery 10 through the PCU 30.

The ECU 100 includes a central processing unit (CPU), a memory (read only memory (ROM) and random access memory (RAM)), and an input and output port that is provided to input and output various signals (all are not shown). The ECU 100 controls the PCU 30 based on a signal received from each sensor and a program and a map stored in the memory, thereby controlling drive of the MG 40 or charging and discharging of the assembled battery 10.

In the embodiment, when a predetermined FS traveling condition is established, a traveling mode of the electrified vehicle 1 transits to an FS mode. For example, the FS traveling condition is established when failure of the sensor unit 20 that detects a state of the assembled battery 10 is detected. Furthermore, for example, when an abnormality (an abnormal increase of a resistance value, an abnormal increase of a self-discharge amount, or the like) of the assembled battery 10 is detected, the FS traveling condition is established. In addition, for example, when a communication abnormality between the sensor unit 20 and the ECU 100 occurs, the FS traveling condition is established. In the FS mode, input and output electric power of the assembled battery 10 is more suppressed than in a normal traveling mode (when the FS mode is not set). For example, an output or torque of the MG 40 is restricted more strictly than in the normal traveling mode, whereby input/output electric power of the assembled battery 10 during the FS mode is suppressed.

When failure occurs in the sensor unit 20 (for example, failure of the voltage sensor 21 or the current sensor 22), the state of the assembled battery 10 cannot be detected by the sensor unit 20. For this reason, when an abnormality occurs in the assembled battery 10 during the FS mode, even though the input and output electric power of the assembled battery 10 is more suppressed than in the normal traveling mode, an abnormality of the assembled battery 10 is likely to progress while the state of the assembled battery 10 cannot be detected by the sensor unit 20.

An abnormality of the assembled battery 10 may occur due to various factors, such as shortage of an electrolytic solution, internal short-circuit caused by a mixed foreign substance during manufacturing, and abnormal deterioration of a material, most of abnormalities of the assembled battery 10 gradually progress, and when a level of an abnormality exceeds a predetermined abnormality detection level, this state is detected as an abnormality of the assembled battery 10. That is, in regard to an abnormality of the assembled battery 10, a sign of the abnormality occurs before the level of the abnormality reaches the abnormality detection level.

Accordingly, in the electrified vehicle 1 according to the embodiment, an abnormality sign of the assembled battery 10 is detected when the sensor unit 20 that detects the state of the assembled battery 10 is normal. Then, when failure of the sensor unit 20 is detected after the sign of the abnormality of the assembled battery 10 is detected, a second FS mode that is different from a first FS mode as the FS mode when the sign of the abnormality is not detected is set. In the embodiment, in the first FS mode, restricted traveling for traveling with more suppressed input and output electric power of the assembled battery 10 than in the normal traveling mode can be performed. In contrast, in the second FS mode, "Ready-OFF" where a vehicle system is stopped is set. The second FS mode is the FS mode in which the use of the assembled battery 10 is restricted more than in the first FS mode. The second FS mode different from the first FS mode is provided, whereby it is possible to suppress the progress of the abnormality of the assembled battery 10 during the FS mode while the state of the assembled battery 10 cannot be detected.

Failure detection of the sensor unit 20 may be executed at a timing of transition to the FS mode (that is, transition to the FS mode with failure detection of the sensor unit 20). Alternatively, failure of the sensor unit 20 may be detected after transition to the FS mode due to a different factor (that is, during the FS mode).

Figure 2:
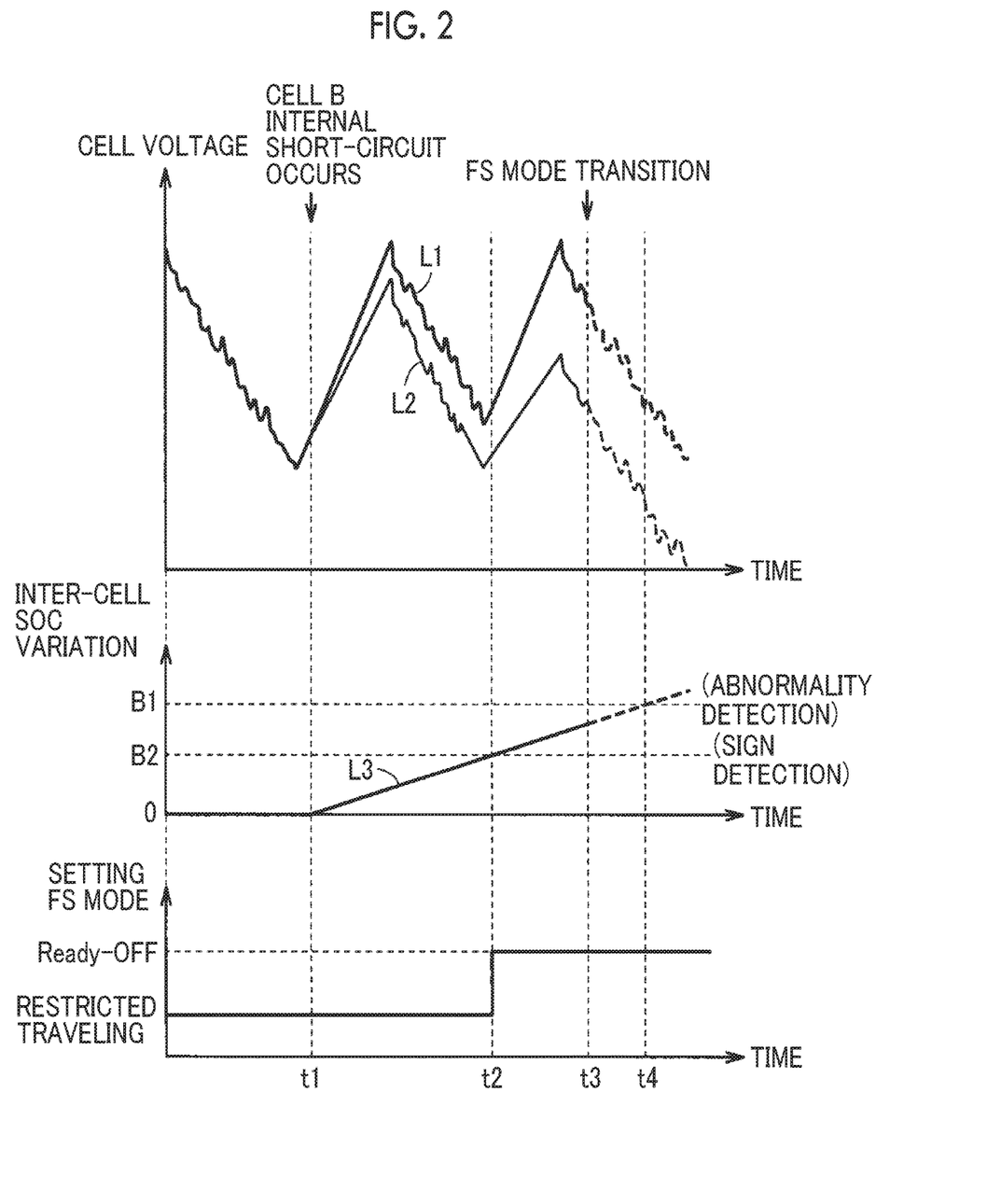
FIG. 2 is a diagram illustrating setting of an FS mode of the electrified vehicle shown in FIG. 1.

FIG. 2 is a diagram illustrating setting of the FS mode in the embodiment. Referring to FIG. 2, a line L1 indicates an example of transition of a voltage of a normal cell (hereinafter, referred to as a "cell A"), and a line L2 indicates an example of transition of a voltage of a cell (hereinafter, referred to as a "cell B") where an abnormality occurs at time t1. A line L3 indicates an example of transition of magnitude of inter-cell SOC variation of the assembled battery 10. The magnitude of the inter-cell SOC variation is an example of a parameter indicating a degree of progress of an abnormality of the assembled battery 10, that is, a "battery abnormality detection parameter".

Before time t1, an abnormality of the assembled battery 10 does not occur, transition of the voltage of each of the cells A, B is the same, and the inter-cell SOC variation does not occur. At time t1, for example, internal short-circuit due to a mixed foreign substance is supposed to occur in the cell B. For this reason, after time t1, the voltage of the cell B transits to be lower than the voltage of the cell A, and the magnitude of the inter-cell SOC variation starts to increase.

Figure 3:
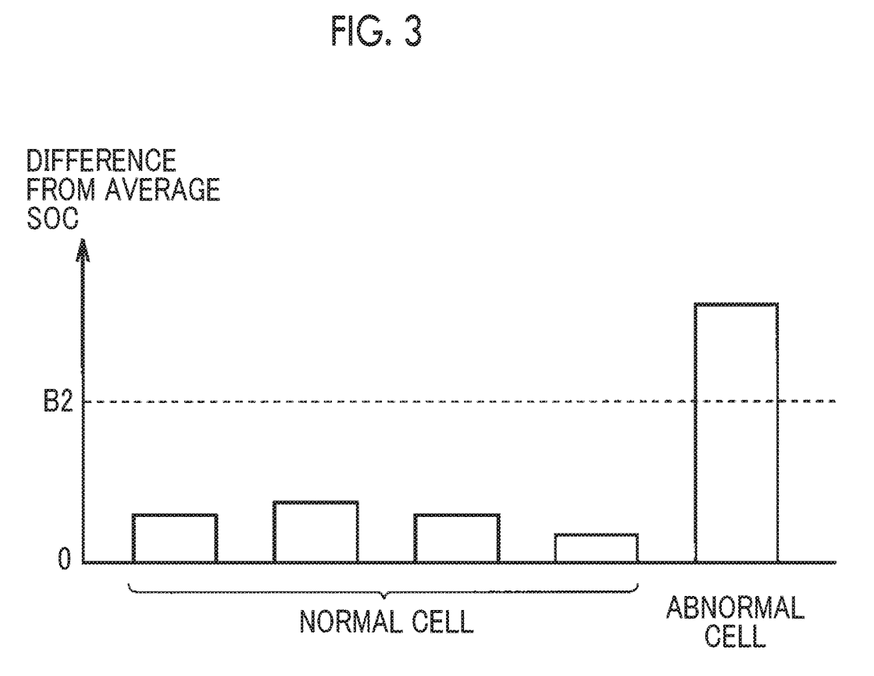
FIG. 3 is a diagram showing inter-cell SOC variation included in an assembled battery shown in FIG. 1.

The magnitude of the inter-cell SOC variation can be represented by, for example, as shown in FIG. 3, the SOC difference between an average SOC of a plurality of cells constituting the assembled battery 10 and an SOC of a cell having the largest SOC difference (absolute value) from the average SOC. Since the SOC is affected by a temperature, as the average SOC, the average SOC of a certain massed cell group (for example, a module, adjacent several cells, or the like) having small temperature variation is preferably employed. A value B2 in FIG. 3 is a value for sign detection of the assembled battery 10, and is a threshold B2 of FIG. 2 (described below).

Referring to FIG. 2 again, at time t2, when the inter-cell SOC variation reaches a predetermined threshold B2, the ECU 100 determines that a sign of an abnormality occurs in the assembled battery 10. The threshold B2 is set to a value smaller than a threshold B1 of the inter-cell SOC variation at which determination is made that an abnormality occurs in the assembled battery 10. The threshold B2 is set to a level at which the magnitude of the SOC variation is likely to reach the threshold B1 of the abnormality detection level even though restricted traveling (first FS mode) is performed after the magnitude of the inter-cell SOC variation exceeds the level, and is obtained in advance by an off-line test, experiment, or the like.

As described above, in the embodiment, at time t2, when the magnitude of the inter-cell SOC variation reaches the threshold B2 of the abnormality sign detection level, the FS mode when transition is made to the FS mode is set to the second FS mode (Ready-OFF). That is, even though transition is not yet made to the FS mode in this stage, when any abnormality is detected and transition is made to the FS mode, transition to the second FS mode (in the example, system stop caused by "Ready-OFF") in which restriction is stricter than in the first FS mode (restricted traveling).

Thereafter, at time t3, for example, transition is supposed to be made to the FS mode with detection of failure of the sensor unit 20. As described above, in the example, since determination is made that the sign of the abnormality occurs in the assembled battery 10 with the magnitude of the inter-cell SOC variation, transition is made to the second FS mode, and the vehicle system is stopped (Ready-OFF). With this, it is possible to restrain a situation in which restricted traveling in the first FS mode as traveling in the FS mode is started at time t3, and the inter-cell SOC variation reaches an abnormality level at time t4.

When transition is made to the FS mode in a state in which the magnitude of the inter-cell SOC variation does not reach the threshold B2 (a level at which determination is made that the sign of the abnormality does not occur in the assembled battery 10), even though restricted traveling in the first FS mode is performed, determination is made that the magnitude of the inter-cell SOC variation is less likely to reach the threshold B1 of the abnormality detection level during restricted traveling. Then, the FS mode is set to the first FS mode (restricted traveling).

In the above-description, although detection of the abnormality of the assembled battery 10 and the sign of the abnormality is made with the magnitude of the inter-cell SOC variation, other parameters may be used. For example, magnitude of inter-cell variation in resistance value, inter-cell variation in capacitance value, or the like may be used as the abnormality detection parameter of the assembled battery 10. Alternatively, an increase rate of resistance of the assembled battery 10, a decrease rate of capacity (full charge capacity) of the assembled battery 10, magnitude of a self-discharge amount of the assembled battery 10, or the like may be used as the abnormality detection parameter of the assembled battery 10. Each of these parameters is a parameter indicating the degree of progress of an abnormality of the assembled battery 10.

Figure 4:
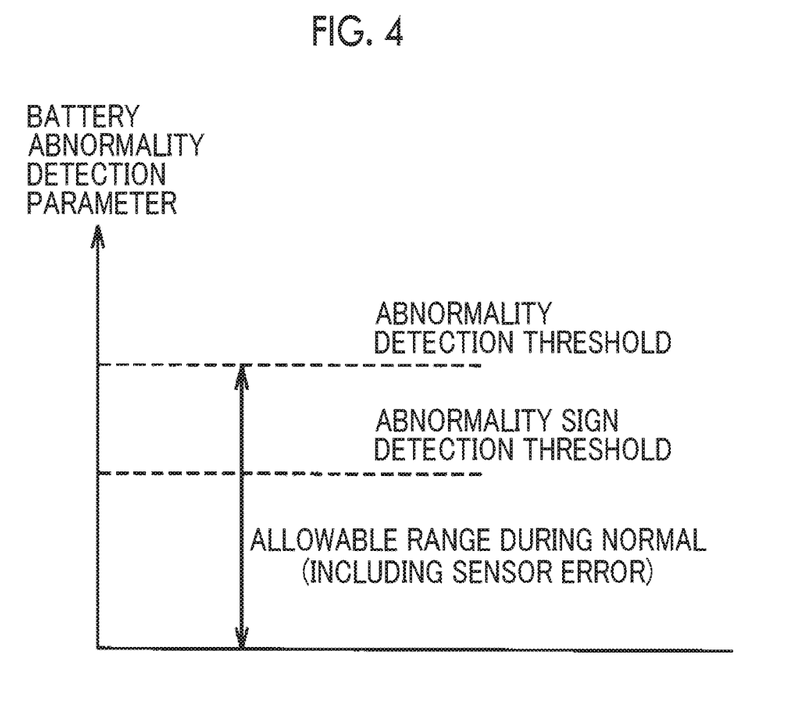
FIG. 4 is a diagram showing the relationship between an abnormality detection parameter for detecting an abnormality of the assembled battery, and an abnormality determination threshold and an abnormality sign determination threshold.

FIG. 4 is a diagram showing the relationship between such an abnormality detection parameter, and an abnormality detection threshold and an abnormality sign detection threshold. Referring to FIG. 4, the abnormality detection threshold is decided depending on the abnormality detection parameter, and is a level determination is made that the assembled battery 10 is abnormal when the abnormality detection parameter reaches the level.

The abnormality sign detection threshold is a value smaller than the abnormality detection threshold as described in the example of the inter-cell SOC threshold of FIG. 2, and is a level at which determination is made that the sign of the abnormality occurs in the assembled battery 10 when the abnormality detection parameter reaches the level.

The abnormality detection threshold also includes a sensor detection error of the sensor unit 20, and is a level at which determination is made that the assembled battery 10 is abnormal when the abnormality detection parameter reaches the level. Accordingly, when the sensor detection error is large, even though the abnormality level of the assembled battery 10 does not reach the level at which determination is made that the sign of the abnormality occurs in the assembled battery 10, the abnormality detection parameter exceeds the abnormality sign detection threshold, and as a result, the FS mode is likely to be set to the strict second FS mode. However, in this case, since it is possible to restrain a situation in which a different abnormality (an abnormality different from an abnormality due to a factor of FS mode transition) further occurs during the FS mode and traveling is performed in a state of double failure, it is understood that setting of the abnormality sign detection threshold to a value smaller than the abnormality detection threshold is on a safe side.

Figure 5:
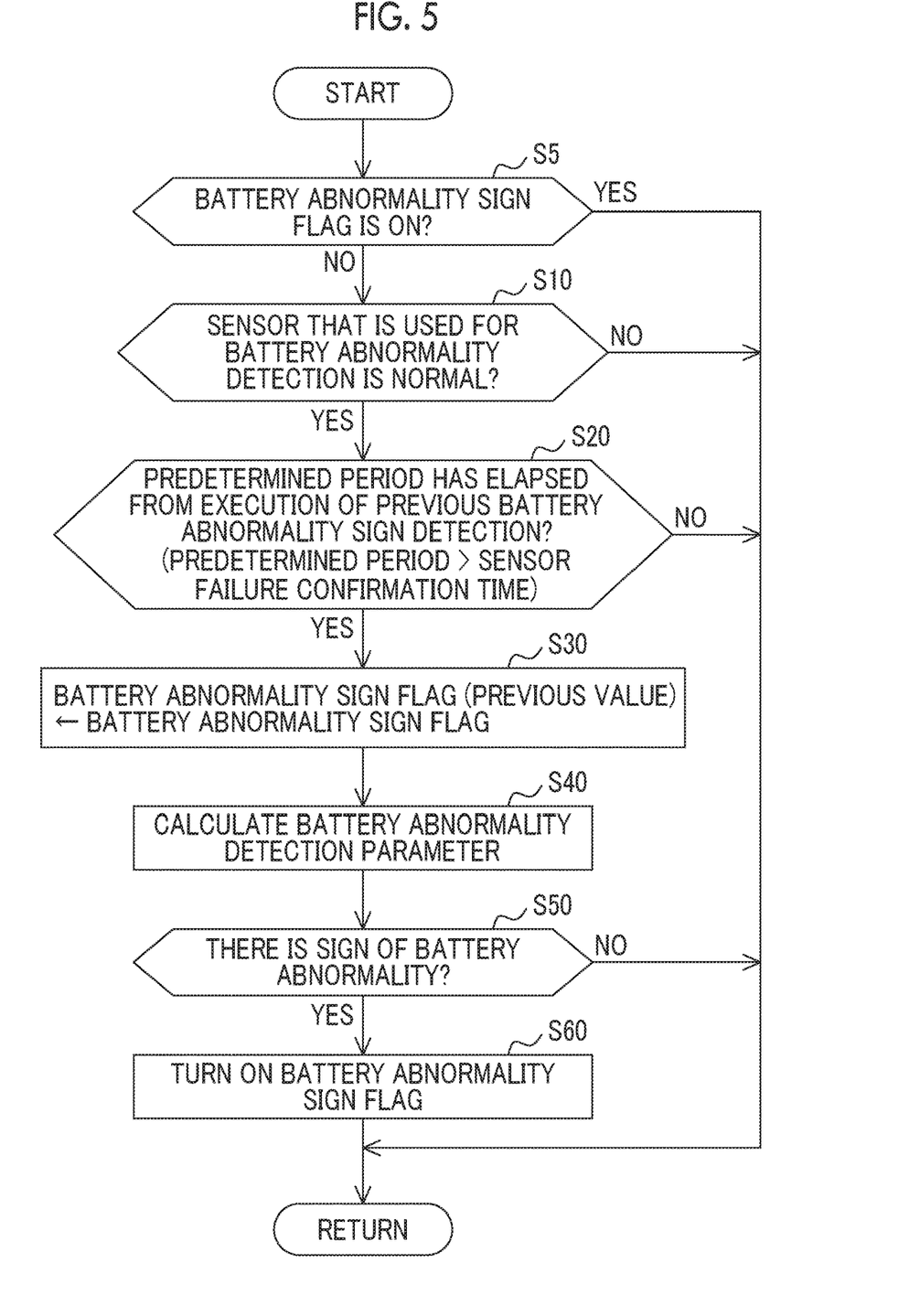
FIG. 5 is a flowchart showing an example of a procedure of abnormality sign determination processing of the assembled battery that is executed by an ECU shown in FIG. 1.

FIG. 5 is a flowchart showing an example of a procedure of abnormality sign determination processing of the assembled battery 10 that is executed by the ECU 100. A series of processing shown in the flowchart is executed repeatedly at every predetermined time during the start of the vehicle system regardless of during the FS mode or during the normal traveling mode.

Referring to FIG. 5, schematically, when a sensor (hereinafter, referred to as a "target sensor") that is using for abnormality detection (including abnormality sign detection) of the assembled battery 10 is normal, the ECU 100 executes detection of an abnormality sign of the assembled battery 10 using a detection value of the target sensor for every predetermined period. Here, in order to make sure that a detection result of the abnormality sign is a result using a detection value when the target sensor is normal, in the embodiment, the predetermined period during which detection of the abnormality sign is executed is set to be longer than a time (failure confirmation time) from when failure occurs in the target sensor until failure is confirmed. Then, before detection of abnormality sign is executed, detection of the abnormality sign is executed after a previous (before the predetermined period) detection result is saved as a previous value. Then, in selecting the FS mode (first FS mode or second FS mode), a detection result saved as the previous value is used.

In detail, in the embodiment, when failure occurs in the target sensor, a predetermined time (for example, about ten seconds) is needed (failure confirmation time) until failure is confirmed. Such a failure confirmation time is provided in order to avoid erroneous determination of failure due to noise or the like. Accordingly, the predetermined period during which detection of the abnormality sign of the assembled battery 10 is executed is set to be longer than the failure confirmation time of the target sensor, and the previous value of the detection result of the abnormality sign is used in selecting the FS mode, whereby the previous value of the detection result of the abnormality sign reliably becomes a detection result using the detection value when the target sensor is normal even though failure of the target sensor occurs at the time of execution of detection of the abnormality sign (a state in which failure is not yet detected).

Hereinafter, the procedure of the abnormality sign determination processing will be described in detail along the flowchart. When a battery abnormality sign flag (described below) is already on (in Step S5, YES), the ECU 100 progresses the process to return without executing a series of subsequent processing.

When the battery abnormality sign flag is OFF (in Step S5, NO), the ECU 100 determines whether or not the sensor (target sensor) that is using for abnormality sign detection of the assembled battery 10 is normal (Step S10). For example, when abnormality sign detection of the assembled battery 10 is executed with the magnitude of the inter-cell SOC variation as the abnormality detection parameter, since a detection value of the voltage sensor 21 or the current sensor 22 is used in calculating the SOC, the voltage sensor 21 or the current sensor 22 becomes the target sensor.

A state in which the target sensor is "normal" means that failure of the target sensor is not detected. Even though failure occurs in the target sensor, failure is not detected for the failure confirmation time from when failure occurs until failure is confirmed, and the ECU 100 determines that the target sensor is normal.

In Step S10, when the ECU 100 determines that the target sensor is normal (in Step S10, YES), the ECU 100 determines whether or not the predetermined period has elapsed from execution of previous abnormality sign detection (Step S20). As described above, the predetermined period is set to be longer than the failure confirmation time of the target sensor. Though not shown, a series of processing shown in the flowchart of FIG. 5 may be executed repeatedly for every predetermined period to omit the processing of Step S20.

In Step S20, when determination is made that the predetermined period has elapsed from execution of previous abnormality sign detection (in Step S20, YES), the ECU 100 stores the battery abnormality sign flag indicating the detection result of the abnormality sign of the assembled battery 10 as the battery abnormality sign flag (previous value) and stores the battery abnormality sign flag (previous value) in the memory (Step S30). As described below, decision is made whether the FS mode is set to the first FS mode or the second FS mode using the battery abnormality sign flag (previous value).

When the battery abnormality sign flag is stored as the battery abnormality sign flag (previous value), the ECU 100 calculates the battery abnormality detection parameter indicating the degree of progress of the abnormality of the assembled battery 10 (Step S40). Specifically, the SOC of each cell is calculated using the detection value of the voltage sensor 21 or the current sensor 22 as the target sensor, and the magnitude of the inter-cell SOC variation is calculated as the abnormality detection parameter. In regard to a calculation method of the SOC, various known methods, such as a method using an OCV-SOC curve (map or the like) indicating the relationship between an open circuit voltage (OCV) and the SOC and a method using an integrated value of a current I, can be used.

Alternatively, a resistance value or a capacitance value of each cell may be calculated using the detection value of each sensor of the sensor unit 20, and the magnitude of variation in resistance value or capacitance value between the cells may be calculated as the abnormality detection parameter. Otherwise, a resistance increase rate or a full charge capacity decrease rate from an initial state of the assembled battery 10, an increase rate of the self-discharge amount, or the like may be calculated as the abnormality detection parameter using the detection value of each sensor of the sensor unit 20. When various parameters described above are used, in regard to a calculation method of the resistance value or the capacitance value of the cell or the assembled battery 10, the self-discharge amount, or the like, various known methods can be employed.

Next, the ECU 100 determines whether or not the sign of the abnormality occurs in the assembled battery 10 based on an execution result of the processing of Step S40 (Step S50). That is, the ECU 100 determines whether or not the abnormality detection parameter calculated in Step S40 reaches the abnormality sign detection threshold (FIG. 4). Specifically, when the magnitude of the inter-cell SOC variation is used as the abnormality detection parameter, the ECU 100 determines whether or not the magnitude of the inter-cell SOC variation reaches the threshold B2 (FIG. 2).

Then, in Step S50, when the ECU 100 determines that the abnormality sign of the assembled battery 10 is detected (in Step S50, YES), the ECU 100 turns on the battery abnormality sign flag (Step S60). In Step S60, until the battery abnormality sign flag is turned on, the battery abnormality sign flag is in an off state. Then, in Step S60, the state of the battery abnormality sign flag is stored as the battery abnormality sign flag (previous value) at the time of execution of the processing of Step S30 at the next time after the predetermined period.

In Step S10, when the ECU 100 determines that the target sensor is not normal, that is, when the ECU 100 determines that failure of the target sensor is detected (in Step S10, NO), the ECU 100 progresses the process to return without executing the processing after Step S20. Accordingly, after failure of the target sensor is detected, detection of the abnormality sign of the assembled battery 10 and update of the battery abnormality sign flag are not executed, and values immediately before failure of the target sensor is detected are retained as the battery abnormality sign flag and the previous value.

In Step S20, even when the ECU 100 determines that the predetermined period has not elapsed from execution of previous abnormality sign detection (in Step S20, NO), the ECU 100 progresses the process to return without executing the processing after Step S30. In addition, in Step S50, even when the ECU 100 determines that the abnormality sign of the assembled battery 10 is not detected (in Step S50, NO), the ECU 100 progresses the process to return without executing the processing of Step S60.

With such a series of processing, even when the target sensor fails at the time of execution of detection of the abnormality sign (a state in which failure is not yet detected), the detection result of the sensor detection value when the target sensor is normal is stored as the battery abnormality sign flag (previous value). Accordingly, in selecting the FS mode depending on the presence or absence of the abnormality sign of the assembled battery 10, the battery abnormality sign flag (previous value) is used, whereby it is possible to use the detection result of the abnormality sign based on the detection value of the normal target sensor reliably.

Figure 6:
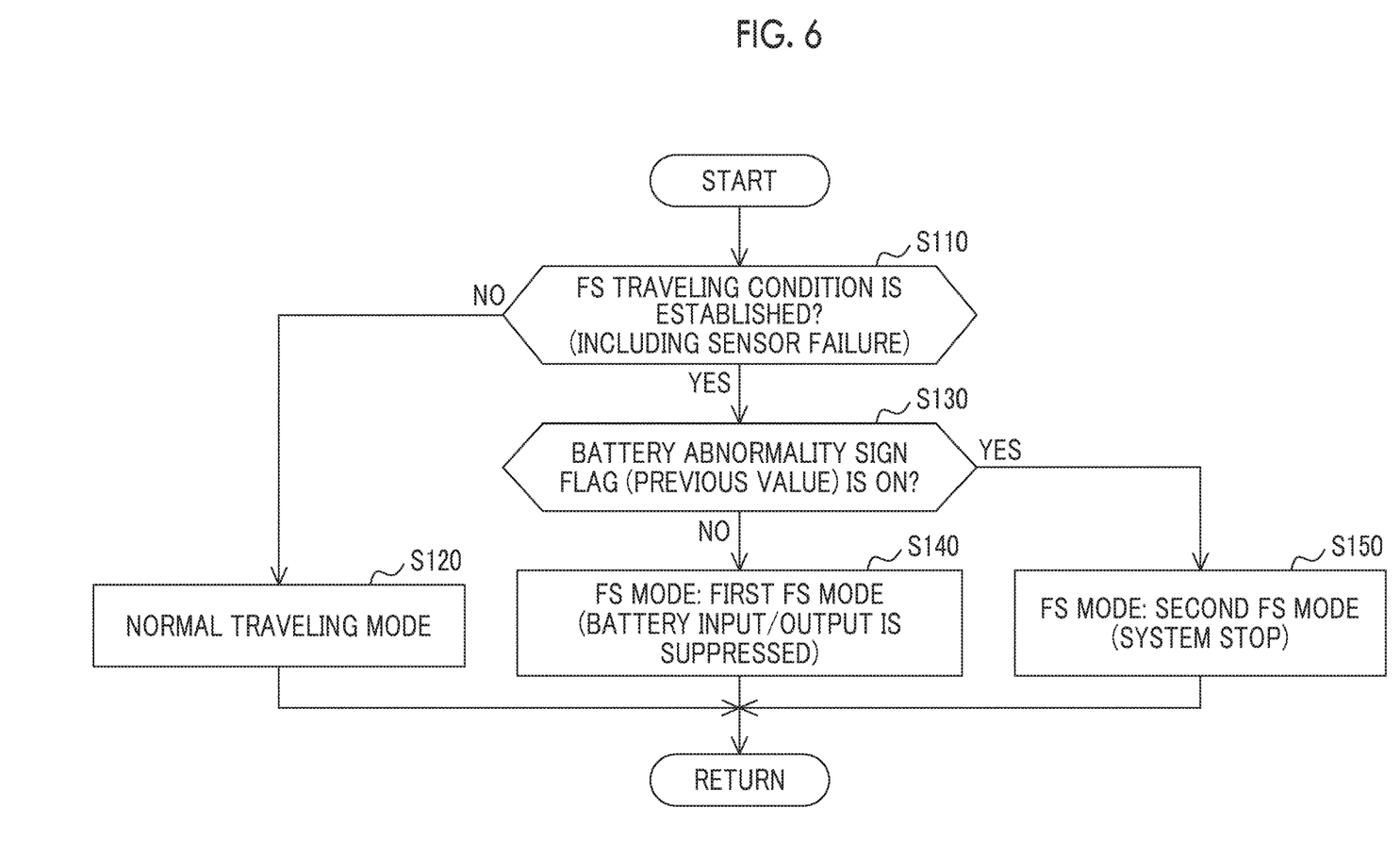
FIG. 6 is a flowchart showing an example of a procedure of traveling mode determination processing that is executed by the ECU.

FIG. 6 is a flowchart showing an example of a procedure of traveling mode determination processing that is executed by the ECU 100. A series of processing shown in the flowchart is executed repeatedly at every predetermined time during the start of the vehicle system.

Referring to FIG. 6, the ECU 100 determines whether or not the FS traveling condition is established (Step S110). Although the FS traveling condition is established when failure of the sensor unit 20 is detected, the FS traveling condition is established even when the abnormality of the assembled battery 10 is detected or even when a communication abnormality between the sensor unit 20 and the ECU 100 occurs.

When the FS traveling condition is not established (in Step S110, NO), the ECU 100 sets the traveling mode to the normal traveling mode (Step S120). The normal traveling mode is a traveling mode when the FS mode is not set, and does not indicate a special traveling mode.

In Step S110, when the ECU 100 determines that the FS traveling condition is established (in Step S110, YES), the ECU 100 determines whether or not the battery abnormality sign flag (previous value) described referring to FIG. 5 is on (Step S130). When the battery abnormality sign flag (previous value) is off (in Step S130, NO), since the sign of the abnormality of the assembled battery 10 is not detected, the ECU 100 sets the traveling mode to the FS mode, and sets the FS mode to a restricted traveling mode as the first FS mode (Step S140). That is, in this case, restricted traveling for traveling with more suppressed input and output electric power of the assembled battery 10 than in the normal traveling mode can be performed.

In Step S130, when the ECU 100 determines that the battery abnormality sign flag (previous value) is on (in Step S130, YES), since the sign of the abnormality in the assembled battery 10 is detected, the ECU 100 sets the FS mode to the second FS mode (Ready-OFF) (Step S150). That is, in this case, in order to restrict the use of the assembled battery 10 more than in the first FS mode in which restricted traveling can be performed, the vehicle system is stopped.

In the embodiment, although Ready-OFF (vehicle system stop) is set in the second FS mode in Step S150, the second FS mode is not limited thereto. For example, as the second FS mode, restricted traveling may be performed while suppressing the input and output electric power of the assembled battery 10 more than in the first FS mode.

Alternatively, when the electrified vehicle of the present disclosure is a hybrid vehicle, in the first FS mode, traveling may be enabled with more suppressed input and output electric power of the assembled battery 10 than in the normal traveling mode, and in the second FS mode, the input and output of the assembled battery 10 may be prohibited and EV traveling (traveling with the MG alone) may be disabled. When the electrified vehicle of the present disclosure is a fuel cell vehicle, in the first FS mode, traveling may be performed with more suppressed input and output electric power of the assembled battery 10 than in the normal traveling mode, and in the second FS mode, the input and output of the assembled battery 10 may be prohibited and traveling may be performed using generated electric power of a fuel cell alone.

As will be understood from the flowchart of FIG. 6, the sequence of the establishment timing of the FS traveling condition and the detection timing of the abnormality sign of the assembled battery 10 based on the battery abnormality sign flag (previous value) does not matter. Even when the FS traveling condition is established after the abnormality sign of the assembled battery 10 is detected and the battery abnormality sign flag (previous value) is turned on, or even when the abnormality sign of the assembled battery 10 is detected and the battery abnormality sign flag (previous value) is on after the FS traveling condition is established, the FS mode is set to the second FS mode in Step S150.

Figure 7:
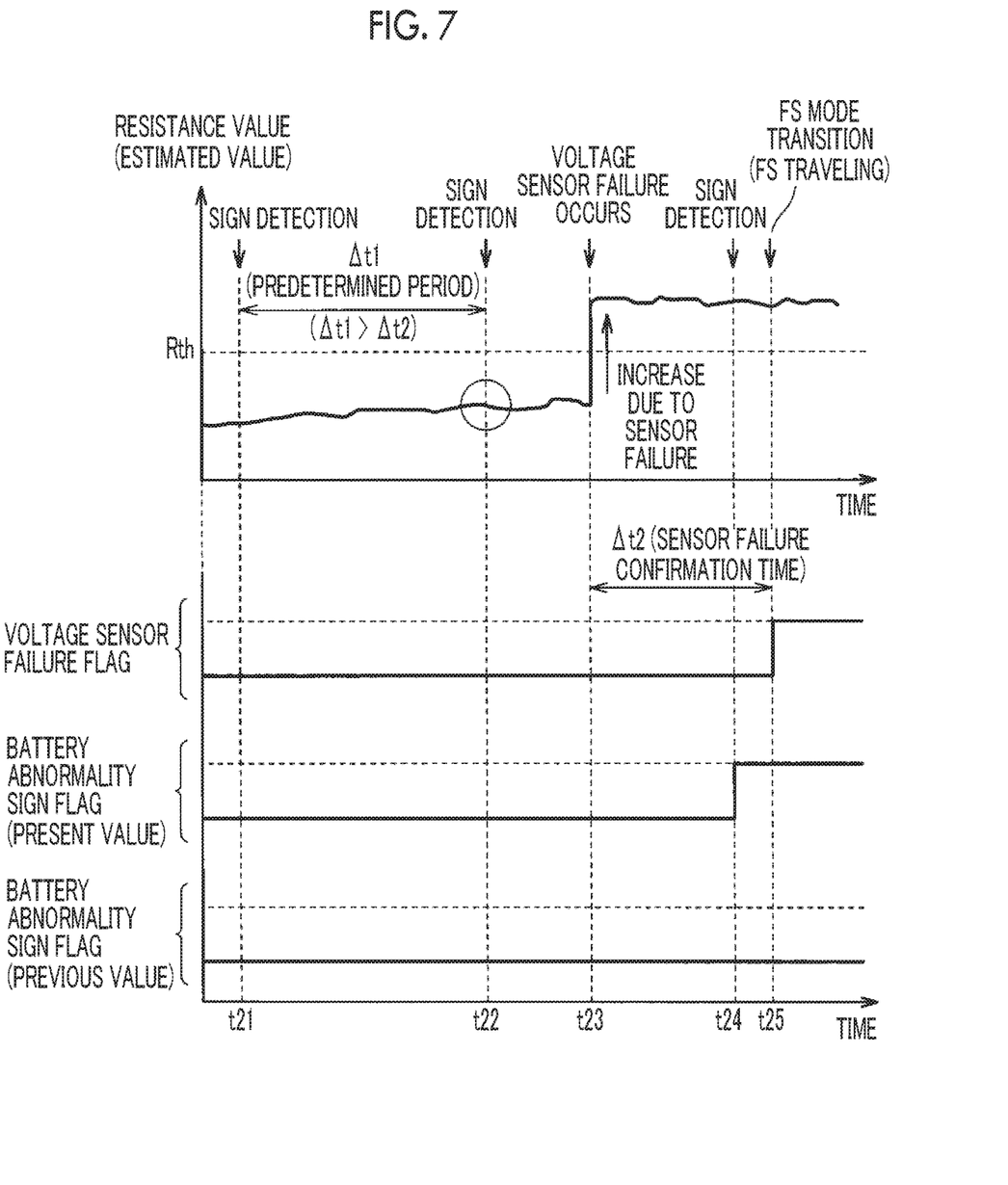
FIG. 7 is a diagram showing an example of transition of a battery abnormality sign flag indicating a sign of an abnormality of the assembled battery.

FIG. 7 is a diagram showing an example of transition of the battery abnormality sign flag. In FIG. 7, transition of the battery abnormality sign flag (previous value) is shown. Furthermore, transition of a present value (a value before being stored as the previous value) of the battery abnormality sign flag is shown. Transition of a failure flag indicating failure of the voltage sensor 21 as the target sensor is shown. In addition, transition of the resistance value (estimated value) of the assembled battery 10 as the abnormality detection parameter is shown.

Referring to FIG. 7, at each timing of time t21, t22, t24, detection of the abnormality sign of the assembled battery 10 is executed for every predetermined period Δt1. Then, at time t23, failure is supposed to occur in the voltage sensor 21. The resistance value (estimated by calculation) of the assembled battery 10 increases with failure of the voltage sensor 21, and exceeds an abnormality sign detection threshold Rth. For this reason, at time t24, determination is made that the sign of the abnormality in the assembled battery 10 is detected, and the battery abnormality sign flag (present value) is turned on.

An increase in resistance value (estimated value) at time t23 is caused by failure of the voltage sensor 21, and actually, the sign of the abnormality of the assembled battery 10 does not occur. At the detection timing of the abnormality sign at time t22 before failure of the voltage sensor 21 occurs, the resistance value falls below the abnormality sign detection threshold Rth, and determination is made that the sign of the abnormality of the assembled battery 10 is not detected. Accordingly, at time t22, both of the present value and the previous value of the battery abnormality sign flag are off.

Failure of the voltage sensor 21 occurred at time t23 is detected at time t25 after elapse of a failure confirmation time Δt2 (Δt1>Δt2) (failure confirmation), and at this time, the failure flag of the voltage sensor 21 is turned on and the traveling mode transits to the FS mode.

As described above, since determination is made at time t24 that the sign of the abnormality of the assembled battery 10 is detected with failure of the voltage sensor 21 at time t23, at time t25 at which the traveling mode transits to the FS mode, the battery abnormality sign flag (present value) is on. However, at the detection timing of the abnormality sign at previous time t22, since determination is made that the sign of the abnormality of the assembled battery 10 is not detected, at time t25 at which the traveling mode transits to the FS mode, the battery abnormality sign flag (previous value) is off. Accordingly, in the example, the FS mode becomes the first FS mode (restricted traveling mode).

At the time of transition to the FS mode at time t25, when the FS mode (first FS mode or second FS mode) is selected using the battery abnormality sign flag (present value), a determination result of the abnormality sign using the detection value of the failed voltage sensor 21 is used, and the second FS mode is selected even though the abnormality sign of the assembled battery 10 does not occur. In contrast, in the embodiment, the FS mode is selected using the battery abnormality sign flag (previous value). Then, an execution interval (predetermined period Δt1) of abnormality sign detection is made to be longer than the failure confirmation time Δt2 of the target sensor (voltage sensor 21), whereby it is possible to select the FS mode using the battery abnormality sign flag (previous value) based on the sensor detection value before failure occurs in the target sensor. In the example, the abnormality sign of the assembled battery 10 does not occur, and the first FS mode (restricted traveling mode) can be selected as the FS mode. At time t25, after failure of the sensor is confirmed, since update of the battery abnormality sign flag is not executed (in Step S10 of FIG. 5, NO), the battery abnormality sign flag (previous value) is not turned on based on the battery abnormality sign flag (present value).

As described above, in the embodiment, the sign of the abnormality of the assembled battery 10 is detected when the sensor (sensor unit 20) that detects the state of the assembled battery 10 is normal, and when the sign of the abnormality is detected, the FS mode is set to the second FS mode (the stop of the vehicle system caused by "Ready-OFF") different from the first FS mode (restricted traveling mode). With this, it is possible to suppress the progress of the abnormality of the assembled battery 10 during the FS mode while the state of the assembled battery 10 cannot be detected due to sensor failure. Therefore, according to the embodiment, it is possible to appropriately protect the assembled battery 10 during the FS mode.

In the embodiment, the sign of the abnormality of the assembled battery 10 is detected for every predetermined period Δt1. Then, the predetermined period Δt1 is set to be longer than the failure confirmation time Δt2 of the sensor, and the FS mode is selected using the previous value of the battery abnormality sign flag indicating the detection result of the abnormality sign. With this, even though failure of the sensor occurs, it is possible to accurately detect the sign of the abnormality of the assembled battery 10 using the sensor detection value when the sensor is normal before the sensor fails, and to switch the FS mode based on the sign detection result.

In the above description, the assembled battery 10 corresponds to an example of an "electric power storage device". The sensor unit 20 corresponds to an example of a "sensor". The PCU 30 and the MG 40 correspond to an example of a "drive device". The ECU 100 corresponds to an example of an "electronic control unit".

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. An electrified vehicle comprising:
   an electric power storage device;
   a drive device configured to generate vehicle drive power using electric power stored in the electric power storage device;
   a sensor configured to detect a state of the electric power storage device; and
   an electronic control unit configured to cause transition of a traveling mode to a fail-safe mode when a predetermined fail-safe traveling condition including failure of the sensor is established, the electronic control unit being configured to:
   detect a sign of an abnormality of the electric power storage device using a detection value of the sensor when the sensor is normal,
   set the fail-safe mode to a predetermined first fail-safe mode, when the fail-safe traveling condition is established and the sign of the abnormality of the electric power storage device is not detected, and
   set the fail-safe mode to a second fail-safe mode different from the predetermined first fail-safe mode, when the fail-safe traveling condition is established and the sign of the abnormality of the electric power storage device is detected.

2. The electrified vehicle according to claim 1, wherein the electronic control unit is configured to:
   in the predetermined first fail-safe mode, perform fail-safe traveling for traveling with more suppressed input and output of the electric power storage device than in a normal traveling mode, and
   in the second fail-safe mode, stop a system of the electrified vehicle.

3. The electrified vehicle according to claim 1, wherein the electronic control unit is configured to:
   detect the sign of the abnormality of the electric power storage device for every predetermined period and store a previous sign detection result at a time of execution of sign detection, the predetermined period being a period longer than a time from an occurrence of failure until the failure is confirmed when the failure occurs in the sensor,
   set the fail-safe mode to the predetermined first fail-safe mode, when the fail-safe traveling condition is established and determination is made that the sign of the abnormality of the electric power storage device is not detected based on the previous sign detection result; and
   set the fail-safe mode to the second fail-safe mode, when the fail-safe traveling condition is established and determination is made that the sign of the abnormality of the electric power storage device is detected based on the previous sign detection result.

4. The electrified vehicle according to claim 1, wherein the electronic control unit is configured to:
   determine that the electric power storage device is abnormal, when a value of a predetermined parameter indicating a degree of progress of an abnormality of the electric power storage device reaches a first threshold; and
   determine that the sign of the abnormality of the electric power storage device is detected, when the value of the predetermined parameter reaches a second threshold smaller than the first threshold.

5. The electrified vehicle according to claim 4, wherein the predetermined parameter is one of: variation in a state of charge among a plurality of cells included in the electric power storage device; variation in resistance value among the plurality of cells; variation in capacitance value among the plurality of cells; an increase rate of the resistance value from an initial state of the electric power storage device; a decrease rate from full charge capacity of capacity of the electric power storage device; and an increase rate of a self-discharge amount of the electric power storage device.

6. A control method for an electrified vehicle including an electric power storage device, a drive device configured to generate vehicle drive power using electric power stored in the electric power storage device, and a sensor configured to detect a state of the electric power storage device, the control method comprising:

detecting a sign of an abnormality of the electric power storage device using a detection value of the sensor when the sensor is normal; and causing transition of a traveling mode to a fail-safe mode when a predetermined fail-safe traveling condition including failure of the sensor is established, the fail-safe mode being set to a predetermined first fail-safe mode when the sign of the abnormality of the electric power storage device is not detected, and the fail-safe mode being set to a second fail-safe mode different from the predetermined first fail-safe mode when the sign of the abnormality of the electric power storage device is detected.

\* \* \* \* \*